United States Patent
Grziwok et al.

(10) Patent No.: US 9,557,767 B2
(45) Date of Patent: Jan. 31, 2017

(54) INTERCHANGEABLE PANELS

(71) Applicant: Lilitab LLC, San Rafael, CA (US)

(72) Inventors: Bryan Rudolf Grziwok, Berkeley, CA (US); Adam Scott Aronson, San Rafael, CA (US)

(73) Assignee: Lilitab LLC, San Rafael, CA (US)

(*) Notice: Subject to any disclaimer, the term of this patent is extended or adjusted under 35 U.S.C. 154(b) by 33 days.

(21) Appl. No.: 14/209,942

(22) Filed: Mar. 13, 2014

(65) Prior Publication Data

US 2014/0265766 A1    Sep. 18, 2014

Related U.S. Application Data

(60) Provisional application No. 61/800,073, filed on Mar. 15, 2013.

(51) Int. Cl.
*G06F 1/16* (2006.01)

(52) U.S. Cl.
CPC ............ *G06F 1/16* (2013.01); *G06F 1/1656* (2013.01)

(58) Field of Classification Search
CPC ......... G06F 1/16; G06F 1/1626; G06F 1/1656
USPC ......... 361/679.01, 679.09–679.56, 600, 683, 361/709, 725, 727, 728–731, 737; 312/223.1–223.3; 248/682, 687, 688
See application file for complete search history.

(56) References Cited

U.S. PATENT DOCUMENTS

| | | | |
|---|---|---|---|
| 5,564,930 A * | 10/1996 | Yu | G06F 1/181 361/679.41 |
| 6,379,073 B1 | 4/2002 | Yoo | |
| 7,218,510 B2 | 5/2007 | Hillman | |
| 7,316,377 B2 | 1/2008 | Smed | |
| 7,694,922 B2 | 4/2010 | Kim | |
| 8,777,002 B2 * | 7/2014 | Lonsdale, II | G06F 1/1626 206/320 |
| 2005/0174723 A1 * | 8/2005 | Chan | H05K 5/0008 361/600 |
| 2005/0247787 A1 * | 11/2005 | Von Mueller | G06K 7/084 235/449 |
| 2007/0127221 A1 * | 6/2007 | Lin | G06F 1/181 361/752 |
| 2008/0310126 A1 * | 12/2008 | Lakoduk | H05K 7/1425 361/731 |
| 2011/0051335 A1 * | 3/2011 | Han | H05K 5/0239 361/679.01 |

(Continued)

OTHER PUBLICATIONS http://armodilo.com/products/armotwist, Armodilo ArmoTwist, 2013, downloaded Sep. 25, 2013, 3 pages.

(Continued)

*Primary Examiner* — Courtney Smith
*Assistant Examiner* — Sagar Shrestha
(74) *Attorney, Agent, or Firm* — Fish & Richardson P.C.

(57) ABSTRACT

Certain implementations of a system for mounting an electronic device, such as a tablet computer, can include an enclosure housing to receive an electronic device, and multiple panels, each panel configured to be removably and interchangeably connected to the enclosure housing to modify a configuration of the enclosure housing based on the electronic device. The system of removable and interchangeable panels can be implemented as part of the design of the enclosure for the electronic devices to allow the enclosure to be flexibly configured with a variety of different accessory devices which may extend the capabilities of the electronic device in desirable ways.

13 Claims, 2 Drawing Sheets

(56) References Cited

U.S. PATENT DOCUMENTS

2012/0049700 A1\* 3/2012 Cochrane ............ H05K 9/0049
                                                                                   312/223.2
2012/0061542 A1    3/2012 Bostater
2014/0204529 A1\* 7/2014 White ................... G06F 1/1675
                                                                                    361/679.55

OTHER PUBLICATIONS http://www.ipadenclosures.com/ipad_kiosk_enclosure/ipad_table_mounts_stands/axis-ipad-table-mount, iPad Enclosures LLC, Axis iPad Mount, 2013, downloaded Sep. 25, 2013, 4 pages.

\* cited by examiner

INTERCHANGEABLE PANELS

CROSS REFERENCE TO RELATED APPLICATIONS

This disclosure claims the benefit of the priority of U.S. Provisional Application Ser. No. 61/800,073, filed Mar. 15, 2013, and entitled "Interchangeable Panels", which is incorporated herein by reference in its entirety.

TECHNICAL FIELD

This disclosure relates to a system of removable and interchangeable panels configured, for example, for the purpose of facilitating the configurability of an enclosure for electronic devices.

BACKGROUND

When an electronic device, such as a computer, control panel, or tablet computer, is presented for public use, it is often housed in an enclosure. This enclosure can have several attributes useful when deployed in a public, unsupervised location. These attributes include physical robustness (to resist damage), tamper ad theft-resistance, resistance to ingress of water and/or contaminants, etc. An enclosure that possesses such attributes may be referred to as a "secure enclosure". One type of secure enclosure, for example, one that is deployed in a public location, may be referred to as a "kiosk".

When electronic devices are deployed as part of a kiosk, they are often configured with certain peripheral accessories to provide desired functionality. Examples of such functionality include credit card reader, bar code scanner, ID imager, camera, etc. Different deployments require different combinations of functionality.

SUMMARY

This disclosure relates to a system of removable and interchangeable panels, as part of the design of an enclosure for electronic devices, for example, tablet computers.

The removable and interchangeable panels allow the enclosure to be flexibly configured to be compatible with a variety of different electronic devices. The removable and interchangeable panels also allow the enclosure to be flexibly configured with a variety of different accessory devices (also called "peripherals") which may extend the capabilities of the electronic device in desirable ways. Examples of such peripherals include the magnetic card readers, headphones, memory card readers, scanners, imagers, speakers, printers, etc.

This disclosure further describes a specific dovetail geometry which uses a minimum amount of internal enclosure space to mount the panels, thus providing clear passage for cables and allowing the overall enclosure to achieve a reduced overall size. This disclosure further describes a series of screws used to mount the panels. The use of screws allows the panels to be removed and replaced in the field by the end user. The screws are located around the perimeter of the enclosure, which allows the user to remove the screws and exchange the panels without removing the tablet. This disclosure further describes the symmetry of the disclosed panels, such that the panels can be mounted on either the right or left side, or on the top or bottom side, of the enclosure, thus providing flexibility in how the electronic enclosure is configured.

Details of one or more implementations of the subject matter described in this specification are set forth in the accompanying drawings and the description below. Other features, aspects, and potential advantages will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
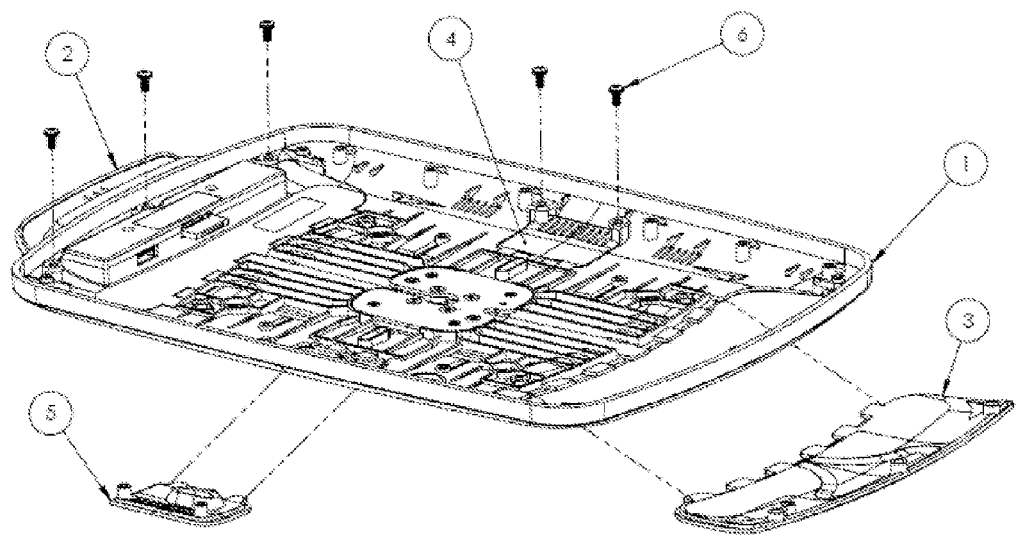
FIG. 1 illustrates the removal and installation of panels into the housing.

This disclosure relates to a system of interchangeable panels, incorporated into the design of a housing that is designed for use with electronic devices (in general) and tablet computers (specifically). When an electronic device, such as a computer, control panel, or tablet computer, is presented for public use, it is often housed in an enclosure. The enclosure can be designed so as to prevent access by unauthorized persons. Such a design can provide for the security of the contents of the enclosure, which can include, for example, a tablet computer or other equipment. The secure enclosure can be physically robust and tough to resist physical abuse. The secure enclosure need not include any accessible fasteners or other mechanism for opening the enclosure without significantly (and sometimes permanently) damaging the enclosure. The enclosure can include a housing, which can be a physical part (i.e., component) of the enclosure. A housing near a front of the enclosure is a front housing and one near a rear of the enclosure is a rear housing. When the secure enclosure is disposed, for example, in an environment in which one or more persons can interact with the enclosure or with the contents of the enclosure (or both), the enclosure can be a kiosk or a kiosk system.

The enclosure described here can be adapted to house various different electronic devices, such as, for example, tablet computers made by multiple different manufacturers, or multiple models of tablet computers made by the same manufacturer. When electronic devices are deployed as part of a kiosk, they are often configured with certain accessories (sometimes called "peripherals") to provide desired functionality. Examples of such functionality include credit card reader, bar code scanner, ID imager, camera, etc. Different deployments can include different combinations of functionality, including the case where no peripheral functionality is desired.

The enclosure described here can include removable and interchangeable panels that can allow the enclosure to be flexibly configured to be compatible with a variety of different electronic devices. The removable and interchangeable panels also allow the enclosure to be flexibly configured with a variety of different accessory devices (also called "peripherals") which may extend the capabilities of the electronic device in desirable ways. Examples of such peripherals include the magnetic card readers, headphones, memory card readers, scanners, imagers, speakers, printers, etc.

In some implementations, the enclosure can include a dovetail geometry which can use a minimum amount of internal enclosure space to mount the panels. Doing so can provide clear passage for cables and allowing the overall enclosure to achieve a reduced overall size. The enclosure can include a series of screws to mount the panels. The use of screws can allow the panels to be removed and replaced in the field by the end user. The screws can be located around the perimeter of the enclosure, which can allow the user to remove the screws and exchange the panels without removing the tablet. In some implementations, the panels can be symmetric so as to be mounted on either the right or left side, or on the top or bottom side, of the enclosure. Such symmetry can provide flexibility in how the electronic enclosure is configured.

Implementations of the subject matter described here can provide one or more of the following potential advantages. The configurability of the panels described here can allow a same enclosure design to support multiple, different electronic devices, as well as multiple different peripheral devices which may be configured in conjunction with the electronic devices. The use of interchangeable panels can allow the same enclosure housing to support a variety of different brands and models of tablet computer. The use of interchangeable panels can also permit a variety of peripheral functions and devices to be supported. The panels can be removed and replaced by a user, allowing the user to reconfigure the system to meet different needs. The interchangeable panels described here can feature a space-efficient series of dovetails that interlock with the enclosure housing at one end and a series of screws along the outboard edge. This combination of details can conserve space beneath the tablet and can allow the panels to be exchanged without removing the tablet. The panels in this system can also be symmetric, resulting in fewer unique parts, more configurability, and allowing the system to be set up in both "right-handed" or "left-handed" configurations.

FIG. 1 illustrates and enclosure housing 1 with removable panels, namely, a first panel 2, a second panel 3, a third panel 4, and a fourth panel 5. Each panel can be independently assembled and disassembled from the enclosure housing 1. For example, the first panel 2 can be a card swipe accessory panel, the second panel 3 can be a blank accessory panel, the third panel 4 can be a blank center panel, and the fourth panel 5 can be a center panel that exposes a rear camera 5. The panels can include dovetails, for example, along the inner edges. To install each panel, the panel can be lifted into place from below with the dovetails on each side of the interface engaging along their respective inner edges. The outboard edges of the panel can be lifted into place and affixed to the enclosure housing using, for example, screws 6 and/or any other suitable type of fastening method, e.g. snaps or (more permanently) heatstakes or rivets. To remove the panel, the process can be reversed. First, the screws (or other removable fastener) are removed, then the panel is pivoted down and away from the housing 1, disengaging the dovetails.

Figure 2:
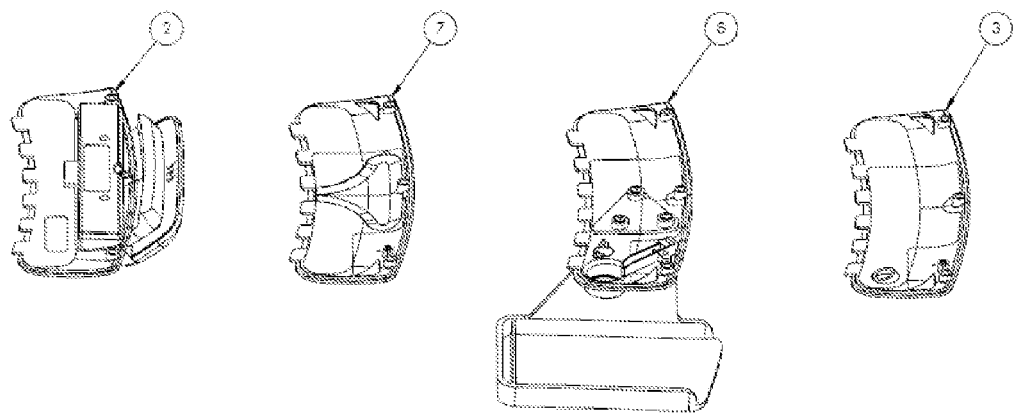
FIG. 2 shows a plurality of accessory panel designs which are compatible with the interchangeable panel system.

FIG. 2 illustrates multiple examples of accessory panels that can be interchangeably mounted in the housing 1. Each panel shown in FIG. 2 can incorporate different functionality, which may then be mounted to the housing when the panel is mounted. Examples of such accessory panels may include any of an accessory panel that incorporates a magnetic card reader 2, a blank panel 7, a panel that holds a macro lens, an imaging shelf 8 (such as might be used to photograph a business card or ID card), and/or a panel that exposes the rear camera 3. These are representative samples of possible accessory panels. Such panels can be interchangeably mounted into an opening on the housing 1. To change the function, one changes the panel. A particular benefit of the interchangeable panel system is that additional features and functionality may be developed and immediately implemented without changing the enclosure housing 1 design, simply by building that functionality into a new panel design.

Figure 3:
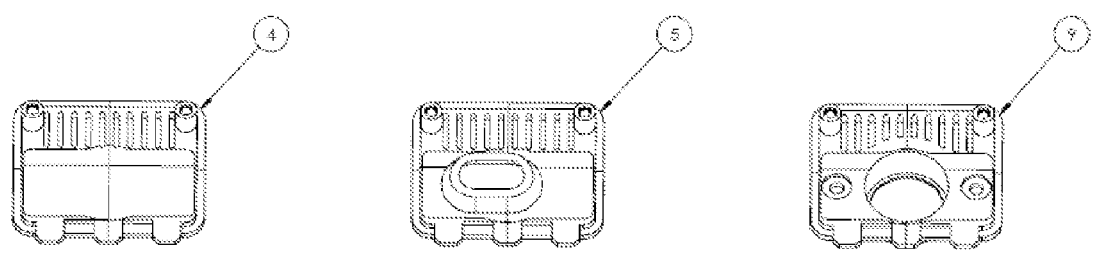
FIG. 3 shows a plurality of center panel designs which are compatible with the interchangeable panel system.

FIG. 3 illustrates multiple examples of center panels which can be interchangeably mounted in the housing 1. The panels shown in FIG. 3 include a blank panel 4, a panel that exposes the rear camera 5, a panel that holds a macro lens and includes mounting features for an imaging shelf 9 (such as might be used to photograph a business card or ID card). These are representative samples of possible center panels. A particular benefit of the interchangeable panel system is that additional features and functionality may be developed and immediately implemented without changing the enclosure housing 1 design, simply by building that functionality into a new panel design.

Figure 4:
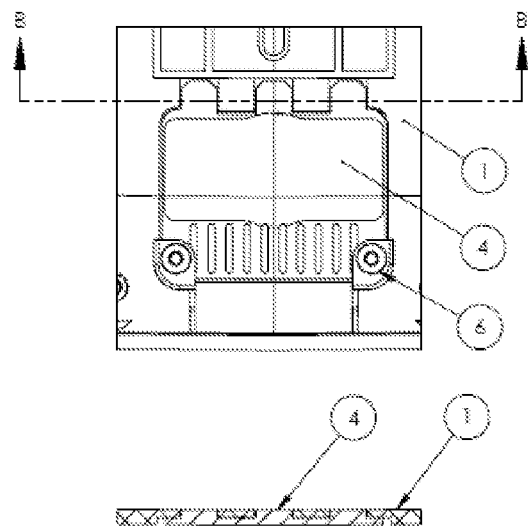
FIG. 4 shows a cross-section through a dovetail geometry.

FIG. 4 illustrates a cross-section of the dovetail joint. Tabs on the panel 4 interleave with tabs on the housing 1, each seating in pockets in the opposite part. This geometry allows the panel and housing to support each other along an edge within the wall thickness of the parts. This allows the overall thickness of the enclosure to be optimized, for a given internal volume, which is often considered aesthetically desirable. FIG. 4 also shows the location of the screws 6 which are used to secure the panel in place. FIG. 4 shows the joint for the center panels, 4/5/9. A similar joint and mounting system can be used for the accessory panels 2/3/7/8.

Certain aspects of the subject matter described here can be implemented as a system of removable and interchangeable panels, as part of the design of an enclosure for electronic devices, for example, tablet computers, for the purpose of allowing the enclosure to be flexibly configured to be compatible with a variety of different electronic devices. Certain aspects of the subject matter described here can be implemented as a system of removable and interchangeable panels, as part of the design of an enclosure for electronic devices, for example tablet computers, for the purpose of allowing the enclosure to be flexibly configured with a variety of different accessory devices which may extend the capabilities of the electronic device in desirable ways. Certain aspects of the subject matter described here can be implemented to utilize specific dovetail geometry as illustrated in FIG. 4, and which as such is able to be contained entirely within the nominal wall thickness of the housing. Certain aspects of the subject matter described here can be implemented to utilize screws along the outside edge to permit removal and replacement of panels in the field by the end user without removal of the electronic device. Certain aspects of the subject matter described here can be implemented to incorporate symmetry in the subject removable panels, such that the panels can be mounted on either the right or left side, or on the top or bottom side, of the enclosure, thus providing flexibility in how the electronic enclosure is configured. Certain aspects of the subject matter described here can be implemented as removable, replaceable, and/or interchangeable panels as part of a secure kiosk system.

A number of implementations have been described. Nevertheless, it will be understood that various modifications can be made without departing from the spirit and scope of the various inventions described herein.

What is claimed is:

1. A system for mounting an electronic device, the system comprising:
   an enclosure housing to receive an electronic device; and
   a plurality of panels, each panel configured to be removably and interchangeably connected to the enclosure housing to modify a configuration of the enclosure housing based on the electronic device, wherein each panel includes a first end and a second end opposite the first end, wherein each panel includes a dovetail geometry on the first end to mate with the enclosure housing, wherein the dovetail geometry comprises a plurality of tabs configured to interleave with a corresponding plurality of tabs on the enclosure housing, wherein the plurality of tabs of the dovetail geometry and the corresponding plurality of tabs on the enclosure housing are configured to support each other along an edge of the enclosure housing within a wall thickness of the enclosure housing,
   wherein the enclosure housing defines an interior region away from outer edges of the enclosure housing, wherein the interior region includes the edge of the enclosure housing, and wherein each panel is configured to attach to the interior region of the enclosure housing, and
   wherein each panel comprises at least one opening to receive a screw to affix each panel to the enclosure housing, wherein the dovetail geometry on the first end of each panel is configured to mate with a corresponding dovetail geometry on the interior edge of the enclosure housing, and wherein each panel is configured to be affixed to the interior region of the enclosure housing by a screw received through the at least one opening in each panel.

2. The system of claim 1, wherein the plurality of panels includes a card swipe accessory panel.

3. The system of claim 1, wherein the plurality of panels includes a blank accessory panel.

4. The system of claim 1, wherein the plurality of panels includes a blank center panel.

5. The system of claim 1, wherein the plurality of panels includes a panel that exposes a rear camera.

6. The system of claim 1, wherein each panel includes the dovetail geometry along an inner edge of the panel.

7. The system of claim 1, wherein each panel includes outboard edges configured to be lifted into place and affixed to the enclosure housing.

8. The system of claim 7, further comprising screws to affix the outboard edges to the enclosure housing.

9. The system of claim 1, wherein the plurality of panels are symmetric and configured to be mounted on either a right side or a left side of the enclosure housing or either a top side or a bottom side of the enclosure housing.

10. The system of claim 1, wherein the second end of each panel comprises at least one opening to receive a screw to affix each panel to the enclosure housing.

11. The system of claim 1, wherein the edge of the enclosure housing is an interior edge, and wherein each panel is configured to connect to the interior edge of the enclosure housing.

12. The system of claim 11, wherein the interior edge of the enclosure housing comprises a plurality of tabs, and wherein the plurality of tabs of each dovetail geometry is configured to interleave with the plurality of tabs on the interior edge of the enclosure housing.

13. The system of claim 12, wherein the second end of each panel comprises at least one opening to receive a screw to affix each panel to the enclosure housing.

* * * * *